United States Patent

Russell

[11] 4,432,870
[45] Feb. 21, 1984

[54] SLUDGE REMOVAL APPARATUS

[75] Inventor: Frederick E. Russell, Elgin, Ill.

[73] Assignee: Protectaire Systems Company, Elgin, Ill.

[21] Appl. No.: 260,888

[22] Filed: May 6, 1981

[51] Int. Cl.³ .................. B05C 15/00; B01D 21/00
[52] U.S. Cl. .......................... 210/143; 98/115 SB; 210/221.1
[58] Field of Search .............. 98/115 SB, 115 R; 210/525, 527, 221.1, 143

[56] References Cited

U.S. PATENT DOCUMENTS

| | | | |
|---|---|---|---|
| 1,314,955 | 9/1919 | Flicker | 210/221.1 X |
| 2,135,442 | 11/1938 | Steindorf et al. | 210/525 |
| 2,159,409 | 5/1939 | Tark | 210/527 |
| 3,396,102 | 8/1968 | Forrest | 210/527 X |
| 3,516,230 | 6/1970 | Saubesty | 98/115 SB X |
| 3,847,802 | 11/1974 | Lemke | 210/527 X |
| 4,102,303 | 7/1978 | Cordier et al. | 98/115 SB X |

FOREIGN PATENT DOCUMENTS

| | | | |
|---|---|---|---|
| 45-28877 | 9/1970 | Japan | 210/527 |
| 637163 | 12/1978 | U.S.S.R. | 98/115 SB |

Primary Examiner—Albert J. Makay
Assistant Examiner—Harold Joyce
Attorney, Agent, or Firm—Fitch, Even, Tabin & Flannery

[57] ABSTRACT

Sludge removal apparatus is provided for new or existing spray coating booths, degreasing tanks, phosphate tanks, plating tanks or the like to remove sludge from the surface of a liquid in the tank. Preferably, a sludge removal tank is disposed adjacent the water holding tank of the coating booth and communicated therewith through an inlet opening. Water jets in the holding tank are directed at the inlet opening creating a current which carries floating sludge to the removal tank. Preferably, air is entrained into water and aids in floating particles. The bottoms of the tanks are preferably swept by water to remove particles settling to the bottom of the tanks. A reciprocating skimmer pushes floating sludge from the sludge removal tank up an inclined beach and into a collection bin.

6 Claims, 8 Drawing Figures

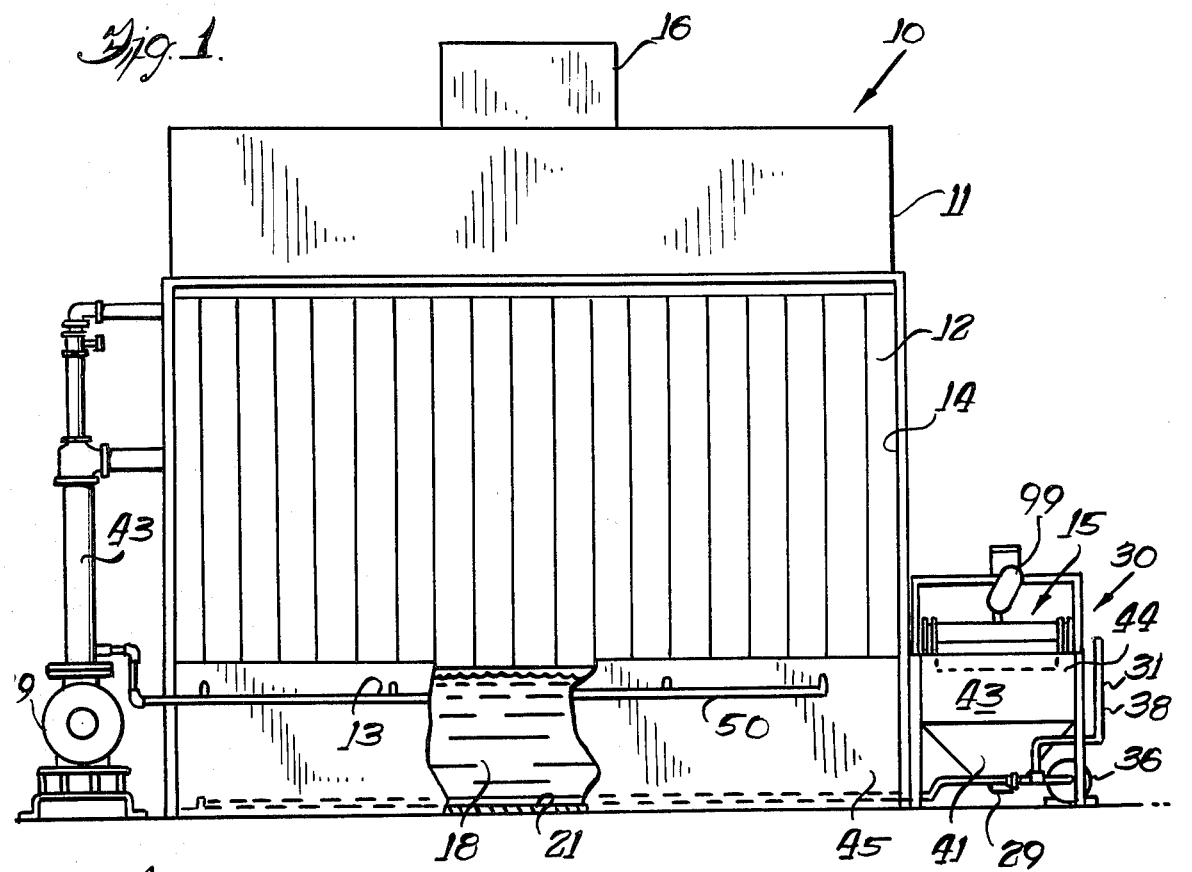
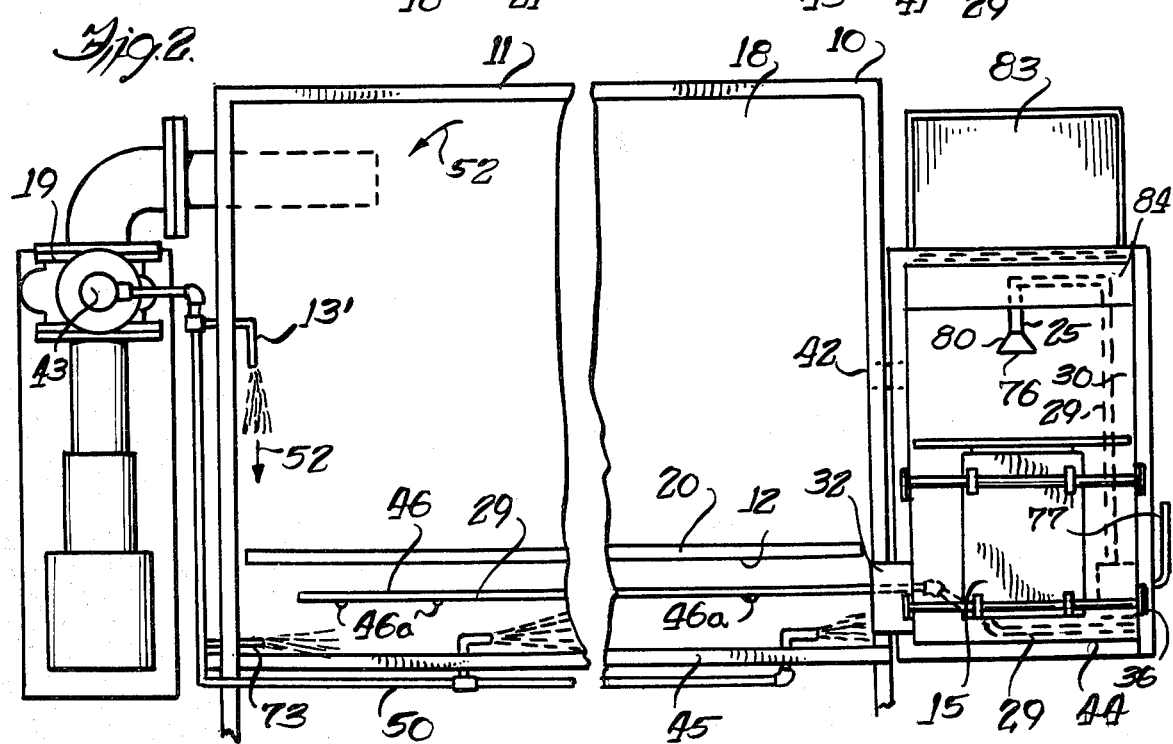

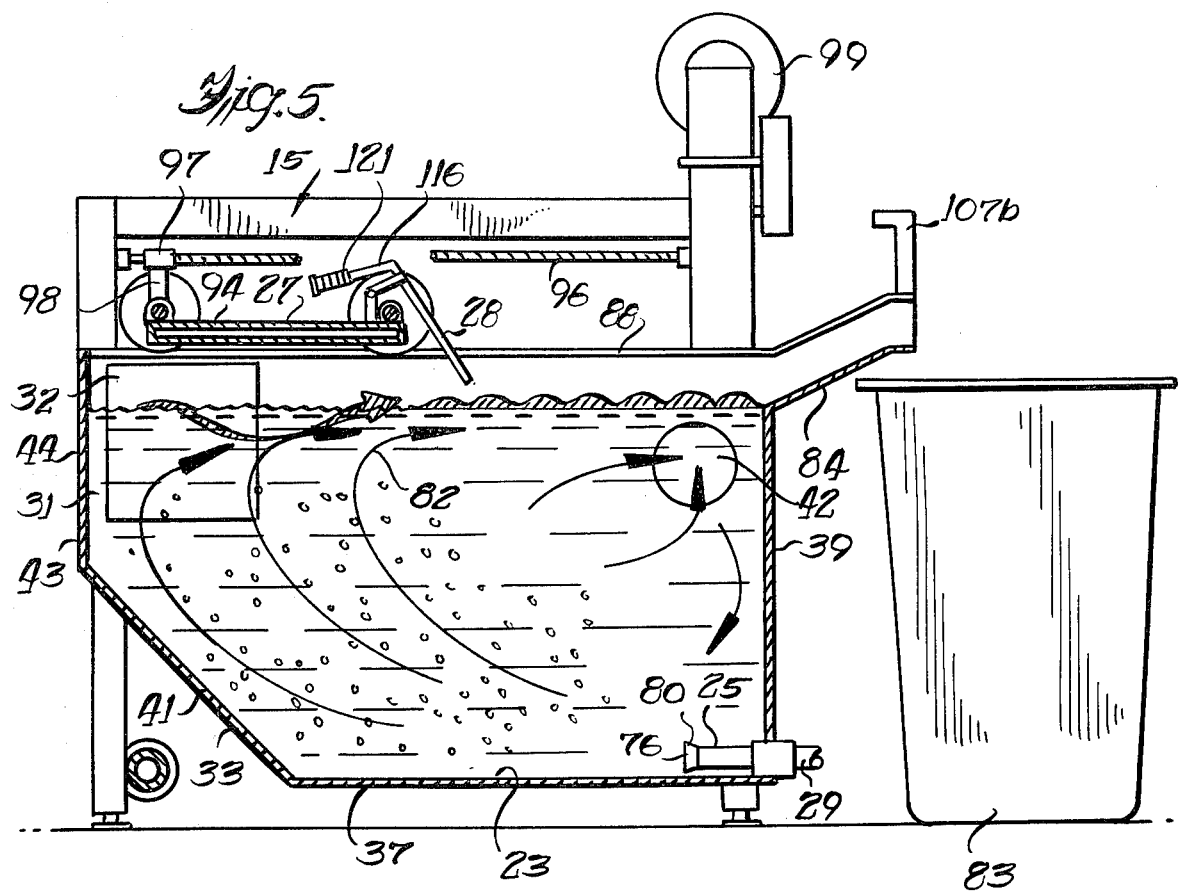
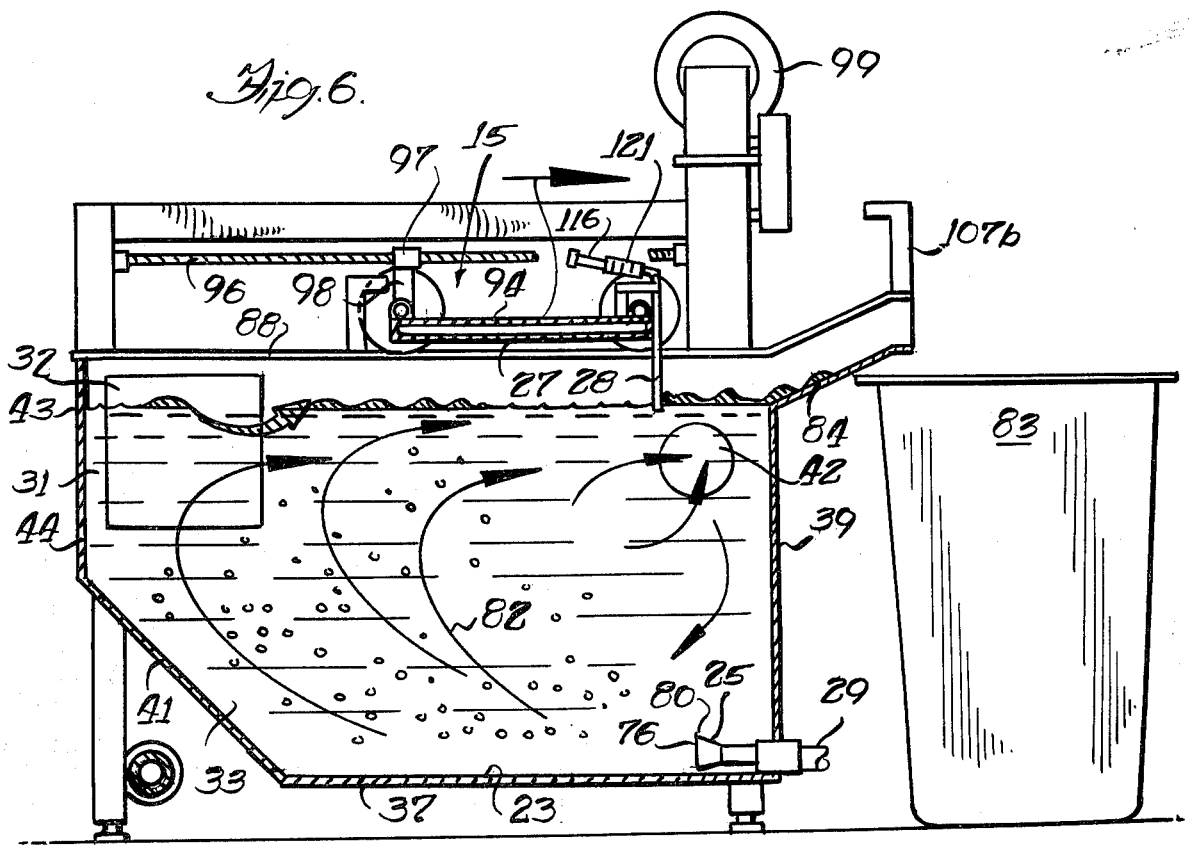

SLUDGE REMOVAL APPARATUS

The present invention relates to an apparatus for conditioning water used in spray booths and includes apparatus for collecting and removing accumulated overspray sludge from the water.

Spraying of coatings such as paints, enamels, lacquers, etc. is commonly conducted in booths in which a flow of air carries overspray particles and volatile organic solvents away from the worker. An efficient method of removing overspray particles from the air within such a booth is to provide water sprays including a sheet or curtain of flowing water in the path of the coating spray and/or air flow, the water curtain trapping the overspray particles. A typical spray booth having a water waste means with a water curtain and a spray behind the water curtain is disclosed in my copending patent application Ser. No. 232,124 filed Feb. 9, 1981, which is hereby incorporated by reference.

While spray booths have been widely used in the industry and have proven their worth in maintaining a healthy interior environment for the workers in the plant, such booths require significant amounts of maintenance, and problems remain pertaining to the disposal of coating waste products into the general environment.

The trapped paint particles fall with the water to the holding tank from which the water is recirculated. Some of the paint particles float on the surface of the water in the holding tank, and other paint particles collect on the bottom of the holding tanks. Most of these tanks have chemicals added to the water in the holding tank to agglomerate the paint spray particles. Many of the particles agglomerate to form a floating piece of sludge. In heavy duty spray booths as much as 100 to 150 gallons of paint may be sprayed in a spraying booth on a daily basis resulting in a significant daily accumulation of particles within the tank. In such heavy duty aplications, the maintenance procedure may involve skimming sludge from the tank every night and to dispatch a crew at the end of every week to drain and manually scrape sludge from the bottom of the holding tank. For some very highly utilized booths, the skimming may have to be done two to four times a day and draining and scraping correspondingly more frequently. Thus, the routine maintenance of a spray booth requires substantial amounts of labor, and booths are shut down for significant periods for cleaning.

An additional problem with spray booths using solvent based coatings is that the booths discharge significant amounts of hydrocarbons into the air and through the exhaust of the booth. For purposes of maintaining the general environment, federal state and local governments impose standards pertaining to the maximum amount of hydrocarbon discharge, and it is difficult for manufacturing plants to meet these requirements when substantial amounts of spray coating is carried out in the plant. Not only is solvent released into the air during the initial spraying, but the solvent continuously evaporates from the trapped overspray particles floating in the water holding tank.

Discharge of the water utilized in the spraying booth presents another substantial waste disposal problem. Because of the solvents, paint particles and the paint agglomerating chemicals, regulations often prevent discharge of the water directly into sewer systems and the water must either be stored in large holding tanks or disposed of under strict governmental supervision. Hence, it is desirable to reuse the water in the holding tank for as long as possible. However, continued use of water entails further problems, particularly the problem of preventing septic conditions within the water. Although chemicals which would prevent growth within the tank may be used, such chemicals further add to the polution problem entailed in the eventual discharge of the water.

While the waste produced in spray coating is generally hazardous to the environment, at least a partial solution to the waste disposed and maintenance problems of spray coating is collection and recycling of the overspray particles and other wastes. Chemicals such as solvents, pigments and coagulents are recoverable from the overspray, and, if collected, the overspray may be sold to chemical companies.

It is a primary object of the present invention to continuously remove waste products from spraying booths, which utilize recirculating water, to ease maintenance costs and reduce discharge of waste into the general environment. It is another object of the invention to treat the water in the booth to permit long term use thereof. It is further object of the invention to collect waste products for recycling.

Waste recovery apparatus is provided to remove overspray particles from the holding tank of a spray coating booth and maintain aerobic conditions within the water of the booth. An auxiliary sludge removal tank is provided adjacent the holding tank of a new or existing spray coating booth to where sludge-laden water is conducted for removal of sludge and aeration of the water before being returned to the holding tank. A plurality of water jets within the holding tank create a current therein which urges floating particles through an opening at the surface of the water between the sludge removal tank and the holding tank. A suction pump, associated with the sludge removal tank, draws sludge-laden water from the bottom of the holding tank and discharges it with entrained air into the sludge removal tank, the entrained air serving to aerate the water and float sludge particles to the surface where a froth of overspray waste is skimmed off into a collection bin for recycling.

These and other objects and advantages of the invention will become more apparent from the following detailed description of the invention in reference to the accompanying drawings in which FIG. 1 is an elevation view of a spraying booth and an attached sludge removal tank embodying various features of the invention.

FIG. 2 is a plan view of the spraying booth and sludge removal tank of FIG. 1.

FIG. 5 is a cross-sectional view of the sludge removal tank showing its sludge skimmer in a rest position.

FIG. 6 is a view similar to FIG. 5 showing the skimmer advancing to skim floating sludge to an edge of the sludge removal tank.

Figure 3:
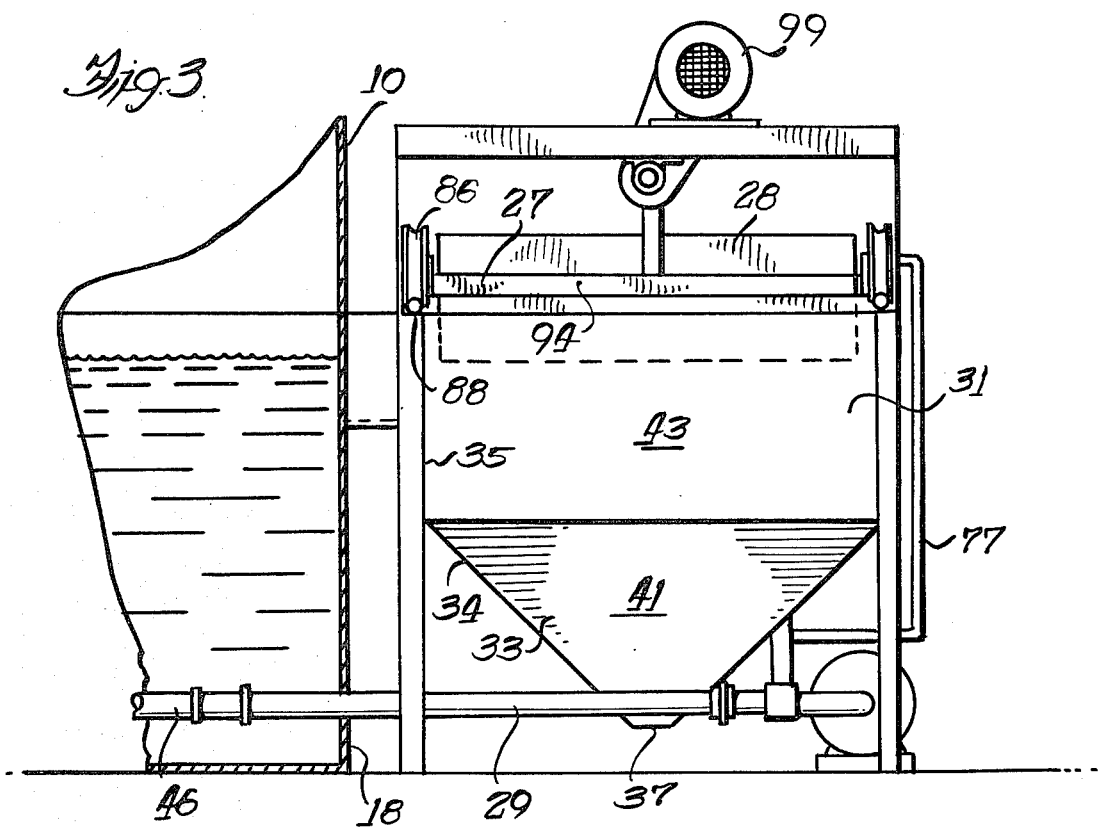
FIG. 3 is an enlarged front elevation view of the sludge removal tank.

In accordance with the present invention, prolonged usage of water and less downtime for cleaning of spray booths 10 is achieved by aerating the water and/or removing of agglomerated spray particles from the surface of the water in a holding tank 18. That is, the water is kept "fresh" by deliberately injecting air into the water being recirculated so as to oxygenate the water to prolong its usage in the water holding tank 18. The floating sludge is directed by water currents into an automatic skimming apparatus for removal. To this end, circulation means in the form of water jets 13 are preferably positioned to cause the surface water carrying the sludge to flow toward and to carry the sludge to a skimmer means 15 which, in this instance, is in an auxiliary tank 30.

Also, in accordance with an important aspect of the invention, a bottom surface 21 of the holding tank 18, and a bottom surface 23 of the auxiliary tank are swept by water circulating means to retard the accumulation of settling particles from the bottom of these respective tanks. Herein, water jets 13, 25 are disposed to eject water under pressure across the bottom surfaces 21, 23 of these respective tanks 18, 30 to carry off particles dropping to the bottom of the tanks.

In accordance with a further aspect of this invention, a skimmer means 15 is provided particularly suited for intermittent operation allowing the skimming apparatus to shut off while sludge froth accumulates on the surface of the water. Herein a carriage 27 reciprocates across the surface of the auxiliary tank 30 and a pusher plate 28 pivotably mounted therefrom, extends through the surface of the water as the carriage is driven in a sludge skimming direction and is tilted out of the water as the carriage is driven in the return direction.

Illustrated in FIG. 1 is a spray booth indicated generally at 10 of the type which utilizes a water wash means including a water curtain 12 to remove overspray particles from the air and preferably the water wash means including a second spray wash at the rear portion of booth, as disclosed in the aforesaid patent application. The booth 10 has a housing 11 for housing articles while being sprayed and for containing air-borne particles of the spray, the housing having a front end opening 14 through which a worker directs a spraying device or gun at objects (not shown) suspended within the booth. Air circulation apparatus (not shown) draws air through the open front of the booth and exhausts it exterior of the plant through an upper exhaust pipe 16. The water curtain 12 is created by water from a lower holding tank 18 which is circulated through a conduit by a pump 19 to the upper end of the booth into an upper reservoir 20 (FIG. 2) from which it overflows back to the holding tank 18 to form the water curtain 12.

The sludge removal tank 30, through which water from the holding tank 18 is continuously circulated, is designed to fit within a relatively small space along side the spray coating booth 10. An upper portion 31 (FIG. 3) of the auxiliary holding tank is rectangular. A lower trough portion 33 of the tank 30 has a trapezoidal transverse cross section having sides 34 (FIG. 3) which angle inward from the vertical sidewalls 35 of the tank and meet at a narrow bottom 37. As best seen in FIG. 5, the back 39 of the tank 30 is vertical while a front panel 41 is inclined rearwardly from an upper front section 43 at an angle of about 45°.

In the embodiment of the invention illustrated, the skimming apparatus is provided with a substantial surface water inflow from the tanks to bring the floating sludge to the skimmer means 15. To this end, a large rectangular inlet opening 32 (FIG. 5) at the surface of the water in the tanks 18, 30 communicates the tanks along a substantial portion of the distance from the front 45 of the holding tank 10 to the water curtain 12. The elongated opening 32 provides for substantial flow of surface water and floating sludge from the portion of the holding tank 18 in front of the water curtain 12 into the sludge removal tank 30. A return opening 42 from the sludge removal tank 30 to the holding tank 18 is disposed below the surface level of the water in the tanks and behind the water curtain 12 allowing cleaned water, but not surface water and floating sludge, to return from the sludge removal tank to the holding tank assisted by the negative pressure existing behind the water-curtain generated by the spray booth exhaust. An intake manifold 46 of a sludge conduit 29 is disposed along the bottom of the holding tank 18 in front of the water current 12 where the major portion of sludge accumulates.

As a means of producing the current in the holding tank 18 which causes the surface water to flow through the inlet opening 32 and which sweeps the bottom surface 21 of the holding tank, a water discharge manifold 50 extends from the conduit 43 leading from the main circulation pump 19 of the spray booth 10 and supplies pressurized water to the water jets 13. A plurality of water jets 13 extend into the holding tank 18 in front of the water curtain 12 and just below the surface and are directed at the rectangular opening 32 whereby the pressurized water from the main pump 19 creates a current in the holding tank 18 which urges floating particles toward the rectangular opening. Typically, water jets 13 will be spaced about every 20 inches along the front 45 of the holding tank 18 to shift the floating particles into the sludge removal tank 30.

An additional water jet 13' disposed behind the water curtain 12 helps to create a generally circular flow of water throughout the holding tank 18 around the water curtain 12 in the direction of the arrows 52 (FIG. 2).

To remove sludge particles which sink to the bottom 21 of the holding tank 18 and which are swept along by the circulation therein, the water and sludge intake manifold 46 of the sludge conduit 29 extends across the bottom of the holding tank in front of the water curtain 12. The sludge conduit 29 is connected to the inlet and suction side of a motor driven pump 36 which is disposed below one of the sloping sides 34 of the trough portion 33 for efficient use of space. A plurality of inlets 46A are spaced along the intake manifold 46, as best seen in FIG. 2, to draw in water and sludge. Water from the water jet sweeps the bottom 23 of the auxiliary tank 30. A diffusing cone 80 at the outlet end 76 of the conduit 29 expands the stream from the discharge water jet 25 providing a broad sweep of the water-sludge-air mixture along the bottom 37 of the tank 30.

Figure 4:
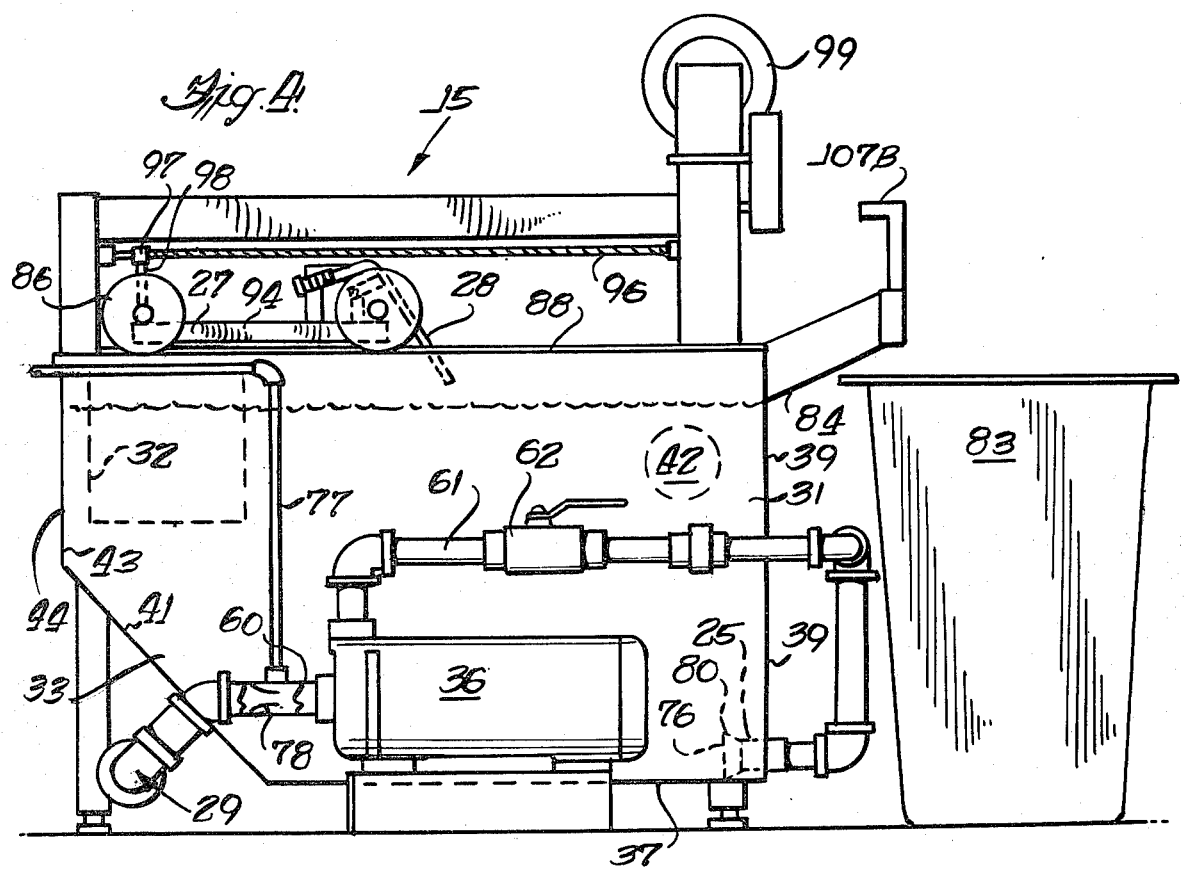
FIG. 4 is a side elevation view of the sludge removal tank.
Figure 7:
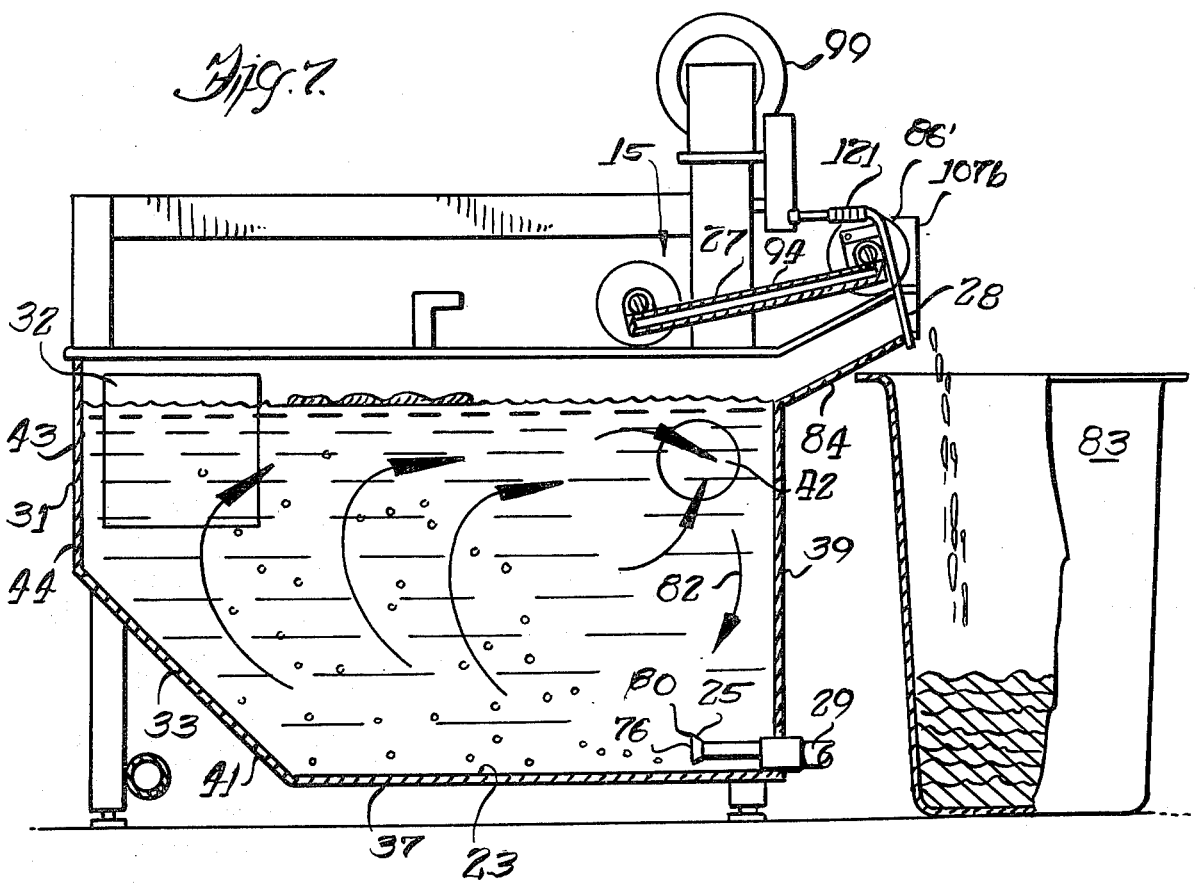
FIG. 7 is a view similar to FIGS. 5 and 6 showing the skimmer delivering sludge up an inclined beach into a waste collector.
Figure 8:
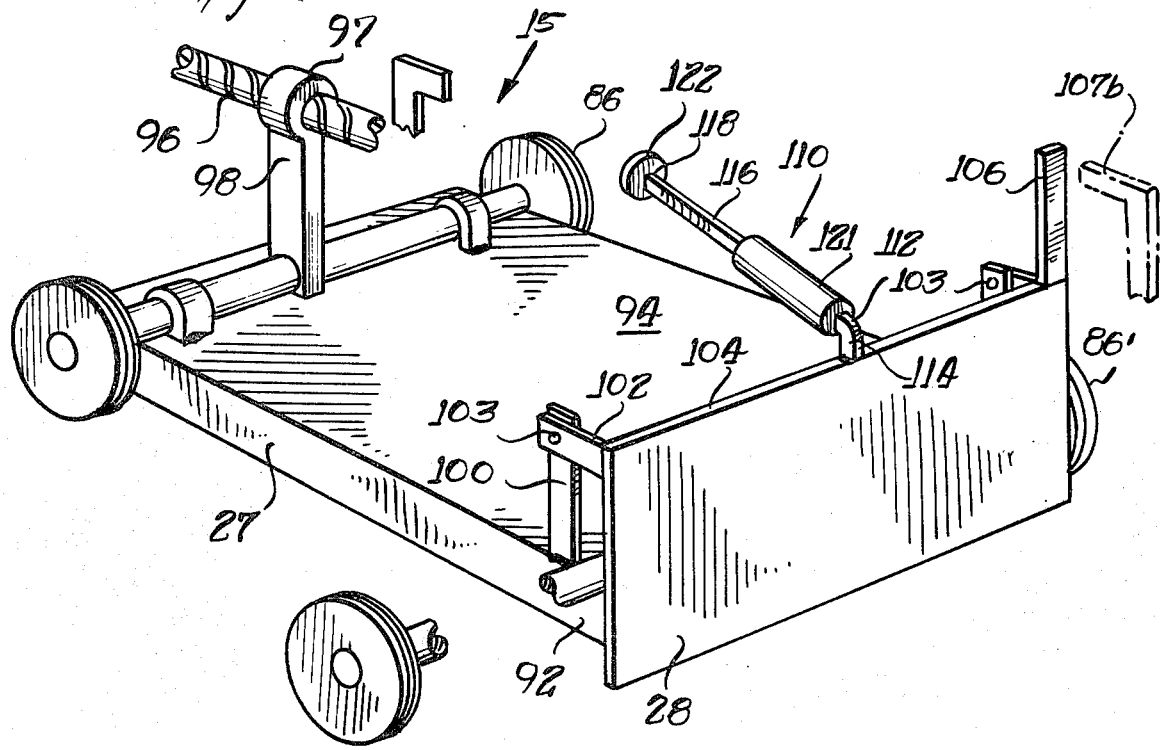
FIG. 8 is a perspective view of the skimmer.

The preferred apparatus for aerating the water in the tanks 18, 30 comprises an air injecting means including an air line 77 connected to the pipe 60 at a venturi 78 (FIG. 4) disposed in the pipe just upstream of the pump 36. The high suction force of the pump causes increased velocity of water flow through the venturi which creates a negative pressure relative to the ambient pressure to draw air down the upstanding air pipe 77 and into the water flowing into the pump whereby air is aspirated into the stream of sludge-laden water.

For a booth holding tank 18 approximately 20 ft.×5 ft. and containing about 1400 gallons of water, a ½ horsepower suction pump 36 is sufficient to keep the bottom 21 of the holding tank 18 generally free of sludge, and the air aspirated is sufficient to assist in aerobic conditions within the water and to reduce putrefaction thereof. In addition to preventing septic conditions in the water, the entrained air bubbles discharging through the water jet 25 in the lower through portion 33 of the sludge removal tank 30 adhere to the sludge particles and buoy the particles to the surface where they, along with particles floated into the sludge removal tank, form a sludge froth on the surface. The narrow bottom 37 of the sludge removal tank 30 is well swept by the discharge through jet's diffuser cone 80, and sludge particles not immediately floated, are eventually floated by continuously discharged air bubbles.

As will be described in connection with FIGS. 5-8, the major portion of the overspray particles trapped by the water curtain and dumped in the holding tank 18 and carried to the sludge removal tank 30 and floated to the surface thereof are removed by the skimming means 15 which shoves the sludge up over a beach 84. Herein, an inclined panel 84 extending outward from the back 39 of the sludge removal tank 30 and through the water surface level serves as a beach over which sludge particle froth is pushed into a collection bin 83. The sludge particle froth is pushed up over the beach 84 by the skimmer means 15 which reciprocates over the surface of the water. The skimmer means 15 includes a carriage 27 (FIG. 8) having a platform 94 which straddles the tank 30 and rolls on four wheels 86 over parallel tracks 88 (FIG. 3) running along the sides of the tank and upwardly along side the inclined beach 84. The sludge is skimmed from the surface water by the pusher plate 28 which is pivotably mounted on the rear end 92 of a carriage platform 94. The carriage 27 is driven by a double screw 95 which cooperates with a threaded unit 97 carried on an upstanding arm 98 which extends upward from the front end of the carriage platform 94. The double screw mechanism 96 operates to drive the carriage 27 in the rearward or skimming direction a predetermined distance, i.e. until the carriage has driven up the tracks 88 alongside the inclined beach 84, and then without a change of screw rotational direction, operates to drive the carriage in the forward or return direction. Such reversing screws and nuts are commercially available.

The pusher plate 28, which has a transverse dimension generally equal to the distance between the tanks side walls, is mounted to pivot between a vertical skimming position (FIG. 6), whereat it extends below the surface of the water for skimming sludge froth as the carriage 27 is driven rearward, to a tilted return position, (FIG. 5) in which it is entirely out of the water when the carriage is driven in the return direction. The pusher plate 28 is pivotally mounted on vertical support bars 100 (FIG. 8), which extend upward from the carriage platform 94, by means of pivot arms 102 attached to one side 104 of the pusher plate and pivotably mounted on the upper end of the support bars by pivot pins 103 which define a horizontal pivot axis. With the pusher plate 28 in its vertical skimming position, the carriage support bars 100 and the pusher pivoting arms 102 are normal to each other.

The pusher plate 28 is shifted automatically between its skimming portion for travel to the right as viewed in FIG. 6, and to its raised return position for travel to the left, as viewed in FIG. 5, by a camming means which encludes an upstanding contact arm 106 on one side of the pusher plate 28 and which serves to pivot the pusher plate about the horizontal axis through the pivot pins when the contact arm 106 hits a lug 107a or 107b mounted adjacent opposite ends of the track 88 for contact with arm 106. Such lugs 107 are mounted at each end of the carriage's path of travel, one such lug 107b contacting the outer surface of the contact arm 106 generally at the rearward position of the carriage 27 to pivot the pusher plate 28 from its vertical position to its tilted position and one such lug 107a contacting the inner surface of the contact arm generally at the forward position of the carriage to pivot the pusher plate from its tilted position to its vertical position.

To hold the pusher plate 28 in one position during its forward or reverse travel, means have been provided in the form of an over center mechanism. The latter preferably is the form of a weighting mechanism 110 (FIG. 8) carried by the pusher plate 28 to maintain the pusher plate in the position to which it has been pivoted by the lug 107 at the front or rear end of the track 88 before being contacted by the other lug 107. The weighting mechanism 110 has a slide or track member 112 with a short arm 114 extending generally vertically upward from the upper edge of the pusher plate 28 and a longer arm 116 which angles upward (with references to the pusher plate in its vertical position) and inward over the carriage platform 94 therefrom. The long arm 116 extends across the pivotal axis of the pusher plate 28 at an angle whereby its inner end 118 is uppermost in the vertical position of the plate but lowermost when the pusher plate is in its tilted position. The long arm 116 provides a track or slide for a plurality of weighted washers 121 slidably mounted thereon which alternately slide from adjacent the pivot axis defined by the pivot pins 103 at which time the weight of plate 28 is sufficient to keep the pusher plate horizontal against the turning torque in the opposite direction by the weights. On the other hand, when the weights slide to hit a stop 122 at the free end of the longer arm, the weight of the pusher plate is insufficient to overcome the turning moment exerted by the weights. That is, the location and weight of the washers 121 is sufficient to switch the center of gravity of the pusher plate 28 from one side of the pivotal axis to the other. When the arm 106 hits the rear lug 107a, and when the pusher plate is pivoted to its tilted position, the weighted washers 121 slide against the stop 122 shifting the center of gravity to maintain the plate 28 tilted until the contact arm 106 again hits the front lug 107a.

Although sludge may be continually building up within the spray coating booth 10, it takes a period of time for sufficient froth to build up on the surface of the sludge removal tank to require skimming. Accordingly, the skimmer means 15 is operated intermittantly to skim sludge after a perod of froth build-up. Typically, the carriage 27 will be actuated by a control unit (not shown) and stop in the forward (retraction) direction just short of full retraction (FIG. 5) with the pusher plate 28 in its tilted position. With the circulation system of the tanks 18, 30 operating to provide circular flows in the tanks as shown in FIGS. 2 and 5, the sludge particles are floated to the top and generally toward the inclined beach 84 at the rear of the sludge removal tank. After a predetermined time has elapsed with the carriage 27 at rest, the drive motor 99 is actuated to turn the double screw 96. The rotation of the screw 96 further drives the carriage 27 forward until the contact arm 106 hits the front lug 107a and pivots the pusher plate 28 to its vertical position extending into the water. Continued rotation of the screw 96 results in automatic reversal of the carriage direction driving the carriage 27 in the rearward sludge-skimming direction (FIG. 6). The carriage 27 moves slowly across the surface of the surface of the water with the pusher plate 28 pushing sludge froth thereinfront.

At the rear of the tank 30, the rear wheels 86' (FIG. 7) ride up the inclined portion of the track 88 along the inclined beach 84, and the pusher plate 28 travels up the inclined beach pushing sludge froth thereup and over the edge into the collecting bin 83. At the end of travel in the sludge-skimming direction, the contact arm 106 hits the rear lug 107b pivoting the pusher plate 28 to its tilted position, and immediately thereafter, the screw 96 reverses the direction of carriage travel. Just before the contact arm 106 hits the front lug 107a, the drive motor 99 is deactuated for a predetermined time, and the process repeats.

Although the skimmer 15 is operated intermittently, the water circulation apparatus will generally be operated continuously even during brief periods when the booth 10 is not being used for spray coating. This not only assures continued aeration of the water in the tanks 18, 30, but allows the circulation system to thoroughly clean the water between coating operations. If, however, the booth 10 is to be unutilized for extended periods of time, e.g. over a weekend, the main pump 19 may be shut down and only the suction pump 36 operated to aerate the water in the tanks 18, 30.

Several advantages of the invention may now be more fully appreciated. The continual cleaning and aeration of the water provides for longer use of a tank full of water. Instead of remaining in the holding tank, releasing hydrocarbons and sinking to the bottom, the greater portion of overspray particles are floated to the sludge tank where they are skimmed off before releasing significant quantities of hydrocarbons. After a collection bin 83 is filled it is covered to prevent further release of hydrocarbons, and the collected overspray may be sold back to a chemical company for recovery of solvent, pigments, coagulents and other recoverable chemicals. Maintenance costs are substantially reduced, and generally, it is not necessary to manually clean the booth nearly as often. The present invention is useable both with new spray booths and could be incorporated therein rather than be a separate stand alone unit which is illustrated herein. The auxilliary apparatus according to the present invention is easily installed with only slight modifications in existing equipment as the bulk of the water purification apparatus is associated with the auxilliary sludge removal tank 30. Having the sludge skimmer 15 entirely outside of the coating booth 10 prevents the accumulation of overspray particles thereon.

While the invention has been described in reference to a preferred embodiment, modifications obvious to one with ordinary skill in the art may be made without departing from the scope of the invention. For example, known types of skimmers such as continuous belt skimmers which carry one or more paddles may be employed to skim the froth from the sludge removal tank. The aeration may be achieved other than through the sludge conduit, for example, by entrainment of air through the circulating water jets in the holding tank.

The water jets 13, 13' are preferably of a commercially available nozzle kind which can be swiveled and turned relative to their water supply pipe so that the direction of outflow from each jet may be adjusted when in an actual working state to accommodate differences in liquid flow patterns which develop in the field. Likewise, these nozzles are of the kind which are adjustable to control the flow rate of water and the velocity of water flow therethrough. Preferably, the nozzles are universally and infinitely adjustable. Thus, by adjusting the water flow rate and the direction of water flow from each nozzle 13 or 13', the circulation of liquid and the sweeping of the tank bottom may be more readily attained by lessening the likelihood of poor circulation or dead spots where particles or sludge would accumulate.

Various features of the invention are set forth in the following claims.

What is claimed is:

1. A sludge removing apparatus for removing sludge from a liquid from an adjacent tank having a water return opening, said apparatus comprising:

a tank means for receiving and holding a supply of liquid and sludge, said tank means having a water inlet at one end thereof at water level to allow surface water and floating sludge thereon to float into the tank means at the water surface level, said adjacent tank having a water level at the water level in said tank means to float the sludge at the same water level into the tank means, said tank means having upstanding side walls with one of said sidewalls being an end wall over which sludge is removed, a water return opening below the surface level of the water in the tank means so that floating sludge does not float out of the tank means aligned with and connected to the opening in the adjacent tank to allow water to flow freely between tanks to maintain the same water level in said tank means and adjacent tank, an automatic skimmer means on said tank means for skimming and extending across a pair of the side walls and for moving the sludge across the surface of the tank means and for skimming and discharging the sludge over the end wall of the tank means, and liquid circulating means including jets for discharging and circulating liquid across the bottom of said tank means to remove settling particles from the bottom of the tank and for circulating the same upwardly to the water surface level in the tank means for removal by said skimmer means.

2. Apparatus according to claim 1 having panel means disposed in front of said liquid circulating means for deflecting the flow of water from said circulating means upward.

3. Apparatus according to claim 1 wherein said skimmer means comprises a carriage having a pusher plate mounted therefrom and a drive means to reciprocate said pusher plate across the tank means in a skimming direction and thereafter in a return direction.

4. Apparatus according to claim 1 having aeration means for entraining air into said circulating means to aerate the water in said tank and buoy particles to the surface.

5. A sludge removing apparatus for use with a spray booth, said apparatus comprising:

a tank for receiving and holding a supply of water and sludge from said spray booth, said tank means having a water inlet at one end thereof at water level to allow surface water and floating sludge thereon to float into the tank means at the water surface level, a water return opening below the surface level of the water in the tank means so that floating sludge does not float out of the tank means, an automatic skimmer means in said tank including a traveling carriage movable in a skimming direction to skim sludge from the surface of the tank and for discharging the sludge, water circulating means for circulating water across the bottom of said tank in a direction opposite to said skimming direction to remove settling particles from the bottom of the tank and for circulating the same upwardly to the water surface level in the tank for removal by said skimmer means, and an inclined panel means disposed in front of said water circulation means for deflecting the flow of water from said circulating means upwards.

6. Skimming apparatus for removing floating solids from a tank comprising:

a carriage and drive means for reciprocating said carriage across said tank in a skimming direction and thereafter in a return direction, a pusher plate pivotably mounted on said carriage for tilting between a position extending into the water surface level and a position entirely above the water surface level, first actuating means disposed at the edge of the tank to which the floating solids are delivered for tilting said pusher plate to the position above the water level surface for reciprocating in the return direction;

second actuating means for tilting said pusher plate to the position extending through the water surface level for reciprocating in the sludge-skimming direction, a track arm being carried by said pusher plate extending across the pivotal axis thereof, and weights slidably mounted on said track arm to slide across said pivotal axis and maintain said pusher plate as tilted by said first or second actuator means until said pusher plate is again tilted by the other actuator means.

* * * * *